United States Patent
Ohara

(10) Patent No.: US 9,146,731 B2
(45) Date of Patent: Sep. 29, 2015

(54) INFORMATION PROCESSING APPARATUS, RELAY SERVER, INFORMATION RELAY METHOD, NON-TRANSITORY COMPUTER-READABLE MEDIUM STORING INFORMATION RELAY PROGRAM, AND COMMUNICATION SYSTEM

(71) Applicant: Kiyotaka Ohara, Nagoya (JP)

(72) Inventor: Kiyotaka Ohara, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/211,145

(22) Filed: Mar. 14, 2014

(65) Prior Publication Data

US 2014/0282481 A1 Sep. 18, 2014

(30) Foreign Application Priority Data

Mar. 15, 2013 (JP) ................. 2013-054087

(51) Int. Cl.
 G06F 9/44 (2006.01)
 G06F 9/445 (2006.01)
(52) U.S. Cl.
 CPC . *G06F 8/65* (2013.01); *G06F 8/665* (2013.01)
(58) Field of Classification Search
 None
 See application file for complete search history.

(56) References Cited

U.S. PATENT DOCUMENTS

| 6,199,204 | B1 | 3/2001 | Donohue |
| 6,202,207 | B1 | 3/2001 | Donohue |
| 2004/0148379 | A1* | 7/2004 | Ogura ........................... 709/223 |
| 2007/0208782 | A1* | 9/2007 | Carter et al. .................. 707/201 |
| 2007/0245333 | A1 | 10/2007 | Ferlitsch |
| 2009/0265723 | A1* | 10/2009 | Mochizuki et al. ........... 719/328 |
| 2011/0209134 | A1* | 8/2011 | Toda ............................. 717/170 |
| 2012/0079473 | A1* | 3/2012 | Watanabe et al. ............. 717/170 |
| 2012/0272084 | A1* | 10/2012 | Tsuji ............................. 713/324 |
| 2012/0311555 | A1* | 12/2012 | Nijenkamp .................. 717/170 |
| 2013/0139139 | A1* | 5/2013 | Mallur et al. ................. 717/170 |
| 2013/0152065 | A1* | 6/2013 | Nishikawa .................... 717/170 |

(Continued)

FOREIGN PATENT DOCUMENTS

| JP | H11-272454 A | 10/1999 |
| JP | 2008-305047 A | 12/2008 |

OTHER PUBLICATIONS

Jun. 4, 2014—(EP) Extended Search Report—App 14160057.7.

*Primary Examiner* — Insun Kang
(74) *Attorney, Agent, or Firm* — Banner & Witcoff, Ltd.

(57) ABSTRACT

An information processing apparatus includes a communication unit configured to perform communication with a specific-firmware-information transmitting apparatus and a firmware providing server through a network; and a control device. The control device is configured to establish a session, between the information processing apparatus and the specific-firmware-information transmitting apparatus, according to a communication protocol enabling server push and establish a connection with the specific-firmware-information transmitting apparatus in the established session; acquire specific-firmware-information, wherein the specific-firmware-information includes at least specific-firmware location-information indicating a location of the specific firmware to update firmware of the information processing apparatus to the specific firmware; acquire the specific firmware from the firmware providing server indicated by the specific-firmware location-information, based on the specific-firmware location-information included in the acquired specific-firmware-information; and update the firmware.

15 Claims, 11 Drawing Sheets

(56) References Cited

U.S. PATENT DOCUMENTS

| | | | |
|---|---|---|---|
| 2013/0198731 A1* | 8/2013 | Inai | 717/170 |
| 2013/0247117 A1* | 9/2013 | Yamada et al. | 725/93 |
| 2014/0055555 A1* | 2/2014 | Imai | 348/14.09 |
| 2014/0181949 A1* | 6/2014 | Hunter | 726/11 |

* cited by examiner

FIG. 2A

[ FIRMWARE STATE TABLE (MFP; NVRAM) ]

| DEVICE ID : OOOOO | | |
|---|---|---|
| FIRMWARE NUMBER | URL | FIRMWARE VERSION (CUSTOM-FIRMWARE) |
| F1 | http:⋯⋯ | ver. X |
| F2 | http:⋯⋯ | ver. Y |
| F3 | http:⋯⋯ | ver. Z |

MFP-SIDE FIRMWARE INFORMATION {F1, F2, F3 rows}

FIG. 2B

[ EMBEDDED-FIRMWARE INFORMATION (MFP; ROM) ]

| FIRMWARE NUMBER | URL |
|---|---|
| F1 | http:⋯⋯ |
| F2 | http:⋯⋯ |
| F3 | http:⋯⋯ |

FIG. 3A

[ FIRMWARE SETTING TABLE (INTERMEDIATE SERVER) ]

| DEVICE ID : OOOOO | | |
|---|---|---|
| FIRMWARE NUMBER | URL | FIRMWARE VERSION (CUSTOM-FIRMWARE) |
| F1 | http:······ | ver. X |
| F2 | http:······ | ver. Y |
| F3 | http:······ | ver. Z |

SERVER-SIDE FIRMWARE INFORMATION: rows F1, F2, F3

(INDIVIDUALLY PREPARED FOR EACH DEVICE (MFP))

FIG. 3B

[ DEVICE MANAGEMENT TABLE (INTERMEDIATE SERVER) ]

| DEVICE ID | OOOOO |
|---|---|
| INTERVAL TIMER (TIMER VALUE) | 150 |
| STATUS (ON/OFF) | ON-LINE |

(INDIVIDUALLY PREPARED FOR EACH DEVICE (MFP))

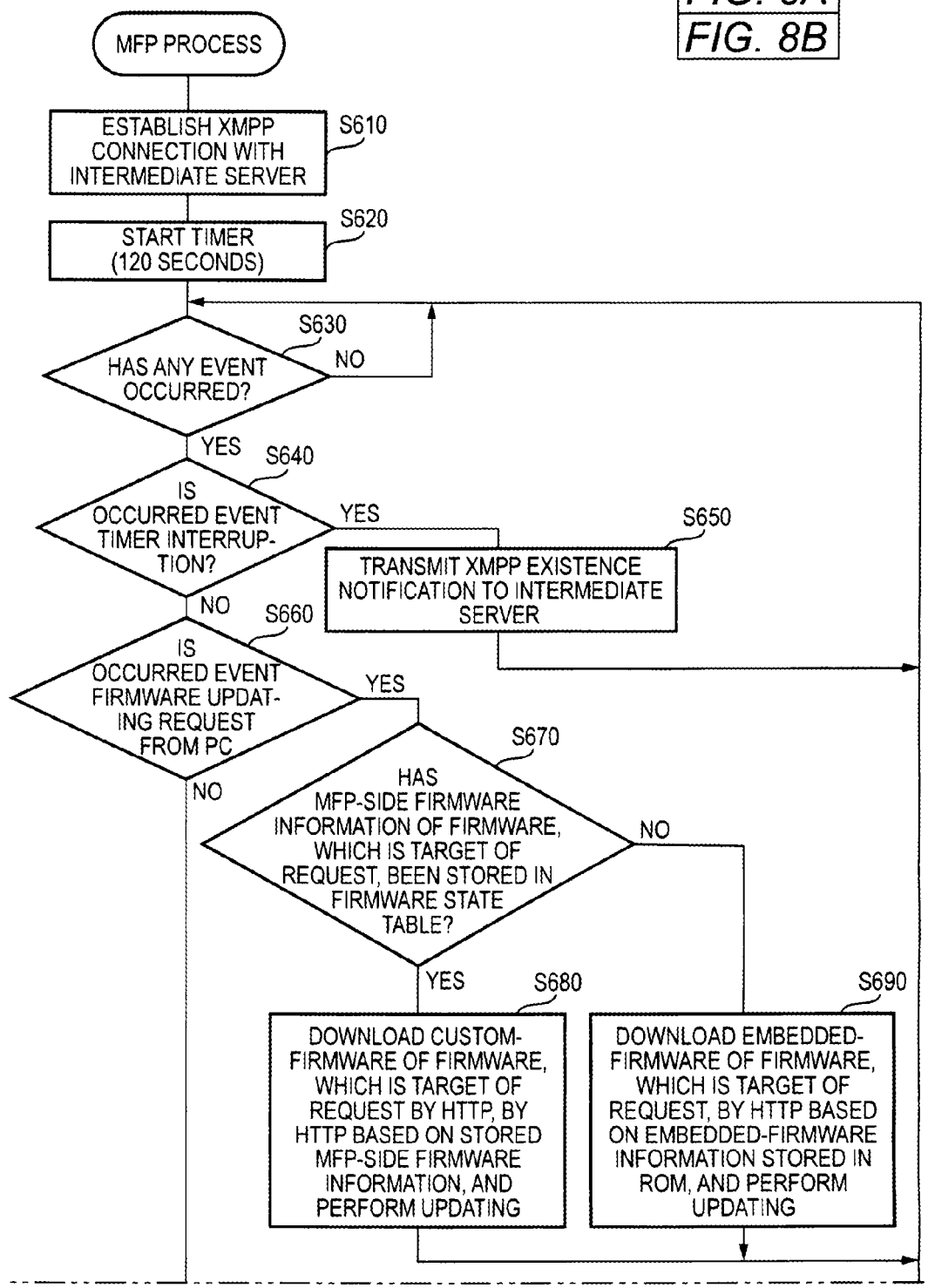

INFORMATION PROCESSING APPARATUS, RELAY SERVER, INFORMATION RELAY METHOD, NON-TRANSITORY COMPUTER-READABLE MEDIUM STORING INFORMATION RELAY PROGRAM, AND COMMUNICATION SYSTEM

CROSS-REFERENCE TO RELATED APPLICATION

This application claims priority from Japanese Patent Application No. 2013-054087 filed on Mar. 15, 2013, the entire subject matter of which is incorporated herein by reference.

TECHNICAL FIELD

This disclosure relates to an information processing apparatus having firmware, a relay server having a function of relaying communications between the information processing apparatus and a specific server, an information relay method and non-transitory computer-readable medium storing an information relay program which are used in the relay server, and a communication system.

BACKGROUND

There have been proposed a variety of firmware updating methods for a variety of information processing apparatuses having network accessing functions.

There is disclosed a technology for using an information processing apparatus to access the Internet, search for update information, access to the website having an uniform resource locator (URL) obtained by the searching, and download software of an update target.

SUMMARY

A method of searching for update information and updating software such as firmware in the information processing apparatus may cause the processing load of the information processing apparatus and the load of a user to increase, and also it may be not capable of updating at an appropriate timing.

Also, in recent years, a variety of specific services for customers (information processing apparatuses) using cloud servers having a variety of resources on the Internet have been developed. As a specific example of the specific services, it can be considered that a specific vendor to collectively manage a plurality of information processing apparatuses of customers from the cloud server side.

In order to implement that specific service, it can also be predicted that it will be necessary to update a part or all of firmware of the information processing apparatuses of the customers to specific firmware specialized for that specific service. In case of providing this specific service, especially, it is required to appropriately and efficiently update firmware of an information processing apparatus which is a specific-service provision object, to desired specific firmware.

This disclosure provides at least a technology to appropriately and efficiently update firmware of an information processing apparatus capable of accessing a network to desired firmware.

An information processing apparatus of this disclosure includes a communication unit configured to perform communication with a specific-firmware-information transmitting apparatus and a firmware providing server through a network; and a control device.

When executing processor-executable instructions, the control device configured to: establish a session, between the information processing apparatus and the specific-firmware-information transmitting apparatus, according to a communication protocol enabling server push; establish a connection, between the information processing apparatus and the specific-firmware-information transmitting apparatus, in the established session; acquire specific-firmware-information from the specific-firmware-information transmitting apparatus through the connection, wherein the specific-firmware-information includes at least specific-firmware location-information indicating a location of a specific firmware to update a firmware of the information processing apparatus to the specific firmware; acquire the specific firmware from the firmware providing server indicated by the specific-firmware location-information, based on the specific-firmware location-information included in the acquired specific-firmware-information; and update the firmware included in the information processing apparatus base on the acquired specific firmware.

According to the information processing apparatus of this disclosure configured as described above, the connection according to the communication protocol for enabling server push from the specific-firmware-information transmitting apparatus is established between the information processing apparatus and the specific-firmware-information transmitting apparatus. Thereafter, when the specific-firmware-information transmitted from the specific-firmware-information transmitting apparatus through the connection and addressed to the information processing apparatus is acquired, the information processing apparatus acquires the specific firmware based on the specific-firmware location-information included in the specific-firmware-information and thus updates base on the acquired specific firmware.

Therefore, according to the information processing apparatus of this disclosure, it is possible to appropriately and efficiently update firmware of the information processing apparatus to specific firmware based on the specific-firmware-information received by the information processing apparatus.

A relay server of this disclosure includes a communication unit configured to perform communication with a specific server and at least one information processing apparatus through a network; and a control device.

When executing processor-executable instructions, a control device is configured to: establish, in response to a request form the information processing apparatus, a first connection between the relay server and the information processing apparatus when a session according to a first communication protocol enabling server push from the relay server is established; establish a second connection according to a second communication protocol different from the first communication protocol, between the relay server and the specific server; acquire a specific-firmware update-command from the specific server through the second connection, wherein the specific-firmware update-command is to update firmware of a particular update target apparatus of the at least one information processing apparatus to specific firmware and includes at least apparatus information indicating the update target apparatus and specific-firmware location-information indicating a location of the specific firmware; and transmit specific-firmware-information including at least the specific-firmware location-information, to the update target apparatus through the first connection based on the acquired specific-firmware update-command.

According to the relay server of this disclosure configured as described above, between the relay server and the information processing apparatus, the first connection is established, and between the relay server and the specific server, the second connection is established. Thereafter, when the specific-firmware update-command is acquired from the specific server through the second connection, the relay server transmits the specific-firmware-information based on the specific-firmware update-command to the information processing apparatus, which is an update target, through the first connection.

Therefore, according to the relay server of this disclosure, it is possible to appropriately and efficiently update firmware of the information processing apparatus to specific firmware based on the specific-firmware update-command from the specific server.

Also, each of the processes which are performed by the control device in the relay server of this disclosure can be implemented as an information relay program for making a computer perform the corresponding process.

Also, both of the relay server and the information processing apparatus of this disclosure are used to construct a communication system, whereby it is possible to provide a communication system capable of appropriately and efficiently updating firmware of the information processing apparatus to specific firmware.

BRIEF DESCRIPTION OF THE DRAWINGS

The foregoing and additional features and characteristics of this disclosure will become more apparent from the following detailed descriptions considered with the reference to the accompanying drawings, wherein:

FIG. 2A is an explanatory view illustrating a firmware state table stored in a NVRAM of a multi-function peripheral (MFP), and FIG. 2B is an explanatory view illustrating embedded-firmware information stored in a ROM of the MFP;

FIGS. 3A and 3B are explanatory views illustrating a firmware setting table and a device management table, which are stored in an intermediate server;

DETAILED DESCRIPTION

Hereinafter, appropriate illustrative embodiments of this disclosure will be described with reference to the accompanying drawings. This disclosure is not limited to specific means and structures and the like of the following illustrative embodiments, and can apply a variety of aspects without departing from the scope of this disclosure. An aspect configured by omitting a part of the configuration of a following illustrative embodiment within a range in which it is possible to achieve the object of this disclosure is also an illustrative embodiment of this disclosure, and an aspect configured by appropriately combining a plurality of following illustrative embodiments is also an illustrative embodiment of this disclosure.

(1) Outline of Specific-Service Providing System 1

Figure 1:
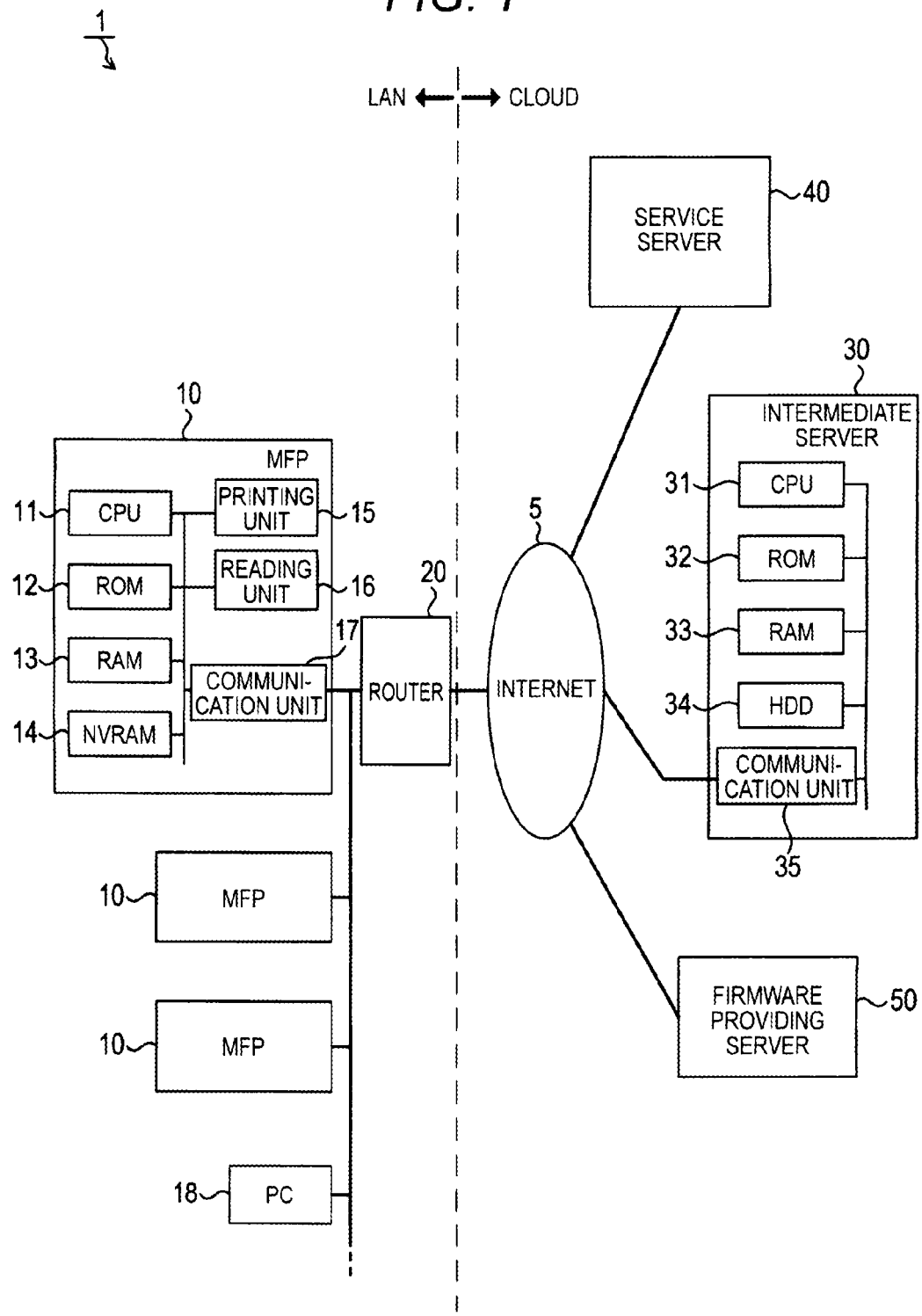
FIG. 1 is a configuration diagram illustrating a schematic configuration of a specific-service providing system of an illustrative embodiment.

As shown in FIG. 1, the specific-service providing system 1 of this illustrative embodiment includes a plurality of multi-function peripherals (MFPs) 10, a personal computer (PC) 18, a router 20, an intermediate server 30, a service server 40, and a firmware providing server 50.

Each MFP 10 can be connected to a variety of resources existing on the Internet 5 through the router 20, and in this illustrative embodiment, each MFP 10 is connected to at least the intermediate server 30 and the firmware providing server 50 such that they can perform data communications with one another. The PC 18 can be connected to the Internet 5 through the router 20 and can also perform data communications with each MFP 10 through the router 20.

The router 20 is a known data relay apparatus for relaying data communications between the plurality of MFPs 10 and the PC 18 and relaying data communications of the plurality of MFPs 10 and the PC 18 with a variety of resources existing on the Internet 5. The router 20 has a variety of functions such as a firewall function and an address translating function (for example, NAT: Network Address translation).

As seen from the router 20, the Internet 5 and a variety of resources connected to the Internet 5 configure a network which is a so-called the cloud side that is, wide area network (WLAN). On the other hand, the router 20, the MFPs 10 and the PC connected to the router 20 configure a network which is a so-called local area network (LAN) side. On the cloud server side, the intermediate server 30, the service server 40, and the firmware providing server 50 are connected to the Internet 5.

Each of the MFPs 10 and the PC 18 in the LAN are connected to the intermediate server 30, the service server 40, and the firmware providing server 50 exiting on the cloud severs, through the router 20, such that they can perform data communications. Also, even on the cloud server side, the intermediate server, the service server 40, and the firmware providing server 50 can perform data communications with one another through the Internet 5. In this illustrative embodiment, communications between the service server 40 and the intermediate server 30, communications between the intermediate server 30 and each MFP 10, and communications between each MFP 10 and the firmware providing server 50 will be described in detail.

In the router 20, the firewall function is a function of preventing the network (LAN) of the inside of the router 20 from being hacked from the outside (the Internet (5) side). The firewall function is used to monitor data flowing in the interface with the outside, and detect and block unauthorized access. The address translating function is a function of performing conversion between private IP addresses, which are used only in the network of the inside of the router 20, and global IP addresses on the Internet 5, on one-to-one.

The specific operations of the firewall function and the address translating function will be described. As examples, operations which are performed by the router in a case where a connection is established between any one MFP 10 and either the intermediate server 30 or the firmware providing server 50 will be described. The operations of the firewall function and the address translating function are different depending on whether a connection between an MFP 10 and a communication party is established according to a request-response type protocol, or is established according to a constant connection type protocol.

The constant connection type protocol means a protocol having a form in which a session is continuously or intermittently maintained as long as possible such that it is possible to perform communications from both sides at arbitrary timings. The request-response type protocol means a protocol having a form in which responses are transmitted with respect to requests. In this illustrative embodiment, as an example, as the constant connection type protocol, XMPP over BOSH (eXtensible Messaging and Presence Protocol over Bidirectional-streams Over Synchronous HTTP) is used, and as the request-response type protocol, HTTP (Hypertext Transfer Protocol) is used.

Specifically, in this illustrative embodiment, communications between the MFPs 10 and the intermediate server 30 are performed mainly through connections according to the constant connection type of XMPP over BOSH, and communications between the MFPs 10 and the firmware providing server 50 are performed mainly through connections according to the request-response type of HTTP. Communications between the service server 40 and the intermediate server 30 are also performed mainly through a connection by HTTP.

In a case where a connection according to an XMPP session request based on the XMPP over BOSH which is a constant connection type protocol (hereinafter, referred to as an XMPP connection) is established between the intermediate server 30 and an MFP 10, the firewall function of the router 20 allows all communications between the intermediate server 30 and the MFP 10 to pass through the router 20. Also, the address translating function of the router 20 performs address conversion with respect to all communications between the intermediate server 30 and the MFP 10. The router 20 identifies a communication party maintaining the XMPP session, whereby those operations are achieved. Therefore, in a case of using an XMPP connection, request information from the intermediate server 30 to an MFP 10 to pass through the router 20 is allowed. A specific procedure for establishing an XMPP session will be described below with respect to Step S610 of FIG. 8A, and thus is not described here.

In a case where a connection by HTTP which is a request-response type protocol (hereinafter, referred to as an HTTP connection) is established between an MFP 10 and the firmware providing server 50, the firewall function of the router 20 allows request information from the MFP 10 to the firmware providing server 50 and response information from the firmware providing server 50 to the MFP 10 to pass through the router 20. However, the firewall function blocks request information from the firmware providing server 50 to the MFP 10. This is because there is a risk that request information from the outside of a firewall might include request information for unauthorized access or invasion. This function is implemented by identifying response information relating to request information transmitted from the MFP 10 to the firmware providing server 50 by the firewall function of the router 20.

Also, the address translating function of the router 20 performs address conversion with respect to request information from the MFP 10 to the firmware providing server 50 and response information from the firmware providing server 50 to the MFP 10. However, the address translating function cannot perform address conversion with respect to request information from the firmware providing server 50 to the MFP 10. Therefore, request information from the firmware providing server 50 to the MFP 10 is blocked. These operations are implemented by identifying response information, relating to request information transmitted from the MFP 10 to the firmware providing server 50, by the router 20.

The specific-service providing system 1 of this illustrative embodiment is a system which a specific vendor can use to provide a specific service to contracted customers. The plurality of MFPs 10 is used by customers, and the specific vendor collectively manages the plurality of MFPs 10 for the customers from the cloud server side, as the specific service. Specifically, the specific vendor can manage the use state, replacement and replenishment timings of consumable goods of each MFP 10, and provide a specific function necessary for the above described management or a specific function desired by a customer, to each MFP 10.

According to the contents of the specific service, it will be necessary to update a part or all of firmware of each MFP 10 of the customers to custom-firmware for a corresponding customer specialized from general-purpose embedded-firmware for that specific service.

Therefore, in this illustrative embodiment, custom-firmware is stored in the firmware providing server 50 as necessary, and firmware information is transmitted to each MFP 10 of the customers to represent the location (URL), contents, and the like of that custom-firmware from the service server 40. When each MFP 10 of the customers receives the firmware information from the cloud server side, based on that firmware information, the corresponding MFP 10 can access to a predetermined URL of the firmware providing server 50 and can download the custom-firmware.

However, in this illustrative embodiment, the firmware information is not transmitted from the service server 40 directly to each MFP 10 of the customers, but is transmitted indirectly through the intermediate server 30. That is, the firmware information from the service server 40 is transmitted, as a custom-firmware designation-command including the firmware information, directly to the intermediate server 30. When receiving the custom-firmware designation-command from the service server 40, the intermediate server 30 transmits the firmware information to each MFP 10 that is a transmission target, based on the contents of the custom-firmware designation-command.

There are various reasons why the intermediate server 30 is interposed between the service server 40 and each MFP 10 of the customers, and a main reason is for making it possible for the service providing side to easily provide a variety of services. When the number of kinds of specific services necessary to be provided increases or when the number of MFPs which are specific-service provision objects increases, the load of the service server 40 increases, and the load of the service providing side increases.

Also, in order to update firmware of each MFP 10 to the latest custom-firmware when needed, it is desired to make it possible to immediately transmit that firmware information from the service server 40 to a desired MFP 10. However, since each MFP 10 is connected to the Internet 5 through the router 20, the router 20 becomes an obstacle, and thus it is difficult to access from the service server 40 directly to each MFP 10.

Therefore, in this illustrative embodiment, a constant connection state between the intermediate server 30 and each MFP 10 based on an XMPP session is maintained such that it is possible to transmit data from the intermediate server 30 to each MFP 10 as necessary. According to this configuration, when the service server 40 transmits information addressed to a predetermined MFP 10, to the intermediate server 30, the intermediate server 30 can transmit necessary information to the destination MFP 10 which is in the constant connection state, through an XMPP session.

That is, since the intermediate server 30 is interposed between the service server 40 and each MFP 10, the service server 40 can easily provide a variety of specific services regardless of the number of MFPs which are specific-service provision targets, without concerning what state each MFP 10 is in (for example, whether each MFP 10 is in a state of being able to perform communications).

(2) Configuration of Specific-Service Providing System 1

The configurations and functions of respective units of the specific-service providing system 1 of this illustrative embodiment will be described in detail.

(2-1) Configuration of MFP 10

An MFP 10 has a plurality of functions such as a printing function, a scanning function, a copying function, and a function of accessing a network. As shown in FIG. 1, the MFP 10 includes a CPU 11 (one example of control device), a ROM 12, a RAM 13, a non-volatile RAM (NVRAM) 14, a printing unit 15, a reading unit 16, a communication unit 17, and so on.

In the MFP 10, the CPU 11 controls each unit of the inside of the MFP 10 and a variety of arithmetic operations according to a variety of programs (including each firmware to be described below) and data stored in the ROM 12 and the NVRAM 14. The RAM 13 is used as a main memory which is directly accessed from the CPU 11, or the like. The printing unit 15 prints images on recording media such as printing paper. The reading unit 16 has an image sensor, and reads images of documents and generates image data representing those images.

The communication unit 17 is a network interface for communicatably connecting the MFP 10 and another apparatus. The communication unit 17 enables the MFP 10 to perform data communications with the PC 18 and data communications with the cloud server side.

The NVRAM 14 is a non-volatile memory in which stored contents are electrically rewritable. A variety of programs and the like stored in the NVRAM 14 include firmware necessary for the operation of the MFP 10. Each MFP 10 of this illustrative embodiment is configured to have three kinds of firmware install therein, and operate based on these three kinds of firmware. The three kinds of firmware are associated with firmware numbers F1, F2, and F3, respectively.

In the product shipping stage of each MFP 10, all of the three kinds of firmware are general-purpose embedded-firmware. That is, the general-purpose firmware for enabling general users to use standard functions have been embedded as default, not custom-firmware specialized for the customers of the specific service.

Meanwhile, when an MFP 10 is registered as a management object of the specific service by the specific vendor, the unique device ID of the corresponding MFP 10 is assigned, and is stored in the NVRAM 14. Since all of the MFPs 10 of this illustrative embodiment are management objects of the specific service, a unique device ID is set for each MFP 10.

When an MFP 10 is registered as a management object, a firmware state table as shown in FIG. 2A is generated in the NVRAM 14 of the MFP 10. Generation of the firmware state table may be implemented by input operation of a user on the MFP 10, or the like, or may be implemented by direct operation or remote operation of the specific vendor, or may be implemented by a variety of other methods.

The firmware state table, which is generated in the NVRAM 14 of the MFP 10, is a table, which stores information indicating whether the firmware has been changed to custom-firmware with respect to each of the three kinds of firmware. In a case where the firmware has been changed to custom-firmware, the firmware setting table also stores information indicating firmware version of the custom-firmware and information indicating URL from which the custom-firmware has been downloaded, as shown in FIG. 2A.

Immediately after the firmware state table is generated, in general, since all of the three kinds of firmware are still in the embedded-firmware states, all of items "URL" and "FIRMWARE VERSION" are in a blank state or a state in which data representing that the corresponding items have not been set have been written. Thereafter, when a request indicating necessity of changing to custom-firmware (specifically, server-side firmware information to be described below) is received from the service server 40 through the intermediate server 30, the MFP 10 updates the firmware state table according to the contents of the request. Specifically, when a request indicating the necessity of changing to custom-firmware for a firmware number is received, the firmware version and URL of custom-firmware are overwritten. Thereafter, with respect to the firmware which has been requested to be changed, the MFP accesses to a URL, and downloads the custom-firmware, and updates the corresponding firmware to the custom-firmware, based on the contents of the request.

Also, a request indicating necessity of returning custom-firmware to embedded-firmware (server-side firmware information to be described below) may also be received from the service server 40 through the intermediate server 30. When receiving a request indicating necessity of returning custom-firmware to embedded-firmware with respect to certain firmware, the MFP 10 deletes the URL and firmware version of the requested firmware from the firmware state table. Thereafter, with respect to the firmware which needs to return to embedded-firmware, the MFP 10 accesses to the URL of the embedded-firmware, and downloads the embedded-firmware, and performs updating to the embedded-firmware, based on embedded-firmware information stored in the ROM 12.

The embedded-firmware information stored in the ROM 12 is information in which for each firmware with each firmware number, a URL indicating the location of embedded-firmware of the corresponding firmware has been set, as shown in FIG. 2B. The embedded-firmware information is stored in the ROM 12 in the product shipping stage of the MFP 10.

Therefore, in a case where it is necessary to return firmware from custom-firmware to the embedded-firmware, or in a case of updating embedded-firmware, the MFP 10 can download the latest embedded-firmware from a designated URL based on the embedded-firmware information stored in the ROM 12 and perform updating.

The contents of the firmware state table, that is, the URL and firmware version of custom-firmware of each firmware number are transmitted as MFP-side firmware information to an MFP 10 having a corresponding device ID.

(2-2) Description of Firmware Providing Server 50

In the firmware providing server 50, each firmware of each MFP 10 is stored. In this illustrative embodiment, with respect to each firmware of each MFP 10, both of embedded-firmware and custom-firmware are stored. Therefore, each MFP 10 accesses to a URL of the firmware providing server 50 by HTTP as necessary, thereby downloading necessary firmware.

However, it is not need to store all of a variety of firmware in one firmware providing server 50. As long as it is possible to use an MFP 10 to access to and download a desired firmware, it is possible to appropriately determine where each firmware will be stored.

(2-3) Description of Service Server 40

From the service server 40, a command for changing of firmware or the like for one or more of the MFPs 10 which are management objects is appropriately transmitted to the intermediate server 30. Examples of this command include at least two kinds, that is, a custom-firmware designation-command for updating firmware to custom-firmware (that is, for changing firmware to custom-firmware), and a custom-firmware release-command for returning firmware from custom-firmware to embedded-firmware.

A custom-firmware designation-command is a command, which is generated and transmitted to the intermediate server 30 when a custom-firmware designation operation is performed by an operator of the specific vendor or the like. The custom-firmware designation operation means operation for designating an URL of the inside of the firmware providing server 50 where the device ID of a desired device (MFP 10) which needs to be updated to custom-firmware, the firmware number and firmware version of the update target, and custom-firmware of the update target have been stored.

When a custom-firmware designation operation is performed by the operator or the like, the service server 40 generates a custom-firmware designation-command based on a variety of information designated by the custom-firmware designation operation. The custom-firmware designation-command includes a set command for notifying each MFP 10, which is an update target, that the custom-firmware designation-command is a command for requesting updating of firmware to custom-firmware, the device ID of each of (one or more) MFPs 10 which are update targets, the firmware number of the firmware of the update target, a firmware version indicating the version of the custom-firmware, which needs to be updated, and an URL indicating the location of the firmware of the update target (inside the firmware providing server 50 in this illustrative embodiment). That is, the custom-firmware designation-command transmitted from the service server 40 is a command for collectively instructing an update instruction and information necessary for updating to all MFPs whose firmware need to be updated to custom-firmware.

The custom-firmware release-command is a command which is generated and transmitted to the intermediate server 30 when a custom-firmware release operation is performed by the operator of the specific vendor or the like. The custom-firmware release operation means operation to designate the device ID of a desired device (MFP 10) which needs to be updated of custom-firmware to embedded-firmware, and the firmware number of the update target.

When a custom-firmware release operation is performed by the operator or the like, the service server 40 generates a custom-firmware release-command based on a variety of information designated by the custom-firmware release operation. The custom-firmware release-command includes a set command for notifying each MFP 10, which is an update target, that the custom-firmware release-command is a command for updating custom-firmware to embedded-firmware (that is, for changing firmware from custom-firmware to embedded-firmware), the device ID of each of (one or more) MFPs 10 which are update targets, and the firmware number of firmware to be updated. That is, the custom-firmware release-command which is transmitted from the service server 40 is a command for collectively instructing an update instruction and information necessary for updating, to all MFPs whose firmware need to be updated to embedded-firmware.

(2-4) Configuration of Intermediate Server

The intermediate server 30 is provided for relaying a variety of commands from the service server 40 to each MFP 10 which is a specific-service provision object, and includes a CPU 31 (one example of control device), a ROM 32, a RAM 33, a hard disk drive (HDD) 34, a communicating unit 35, and so on.

The CPU 31 executes a variety of programs stored in the ROM 32 and HDD 34, thereby implementing the above described functions such as a command relaying function. In the ROM 32, a variety of programs, data, and the like, to be executed by the CPU 31 are stored. The RAM 33 is used as a main memory which is directly accessed from the CPU 31.

The communicating unit 35 is a network interface for communicatably connecting the intermediate server 30 and another apparatus. The communicating unit 35 enables the intermediate server 30 to perform data communications with each MFP 10 and the service server 40.

In the HDD 34, a variety of software including an OS has been installed. Also, in the HDD 34, a firmware setting table shown in FIG. 3A and a device management table shown in FIG. 3B are also stored. These tables have not been stored in an initial state, and are generated by performing communications with an MFP 10 or the service server 40 and are stored.

The firmware setting table shown in FIG. 3A is individually generated for each device (each MFP 10) which is a specific-service provision object. Specifically, when a custom-firmware designation-command for an MFP 10 is transmitted from the service server 40 for the first time, a firmware setting table corresponding to that MFP 10 is generated.

As shown in FIG. 3A, with respect to each of the three kinds of firmware associated with the device ID of an MFP 10, the firmware setting table stores information indicating whether changing to custom-firmware is necessary. In a case where updating to custom-firmware is necessary, the firmware setting table also stores information indicating version (firmware version) of the custom-firmware and information indicating URL from which the custom-firmware can be acquired (downloaded).

Every time any one of the above described commands for the firmware setting table is received the service server 40, the contents of the firmware setting table is updated according to the contents of the command. For example, in a case where a custom-firmware designation-command for the MFP 10 having a certain device ID and the custom-firmware designation-command indicating necessity of updating the firmware having the firmware number F1 to custom-firmware is received, an URL and a firmware version included in the custom-firmware designation-command is written (overwritten) in the firmware setting table of the aimed MFP 10, as a URL and a firmware version corresponding to the firmware number F1. Also, for example, in a case where a custom-firmware release-command for an MFP 10 having a certain device ID and the custom-firmware release-command indicating necessity of returning the firmware having the firmware number F2 or F3 from custom-firmware to embedded-firmware is received, from the firmware setting table of the aimed MFP 10, an URL and a firmware version corresponding to the firmware number F2 or F3 is deleted.

The intermediate server 30 transmits the contents of the firmware setting table, that is, the URL and firmware version of each firmware number, as the server-side firmware information, as necessary.

The device management table shown in FIG. 3B is individually generated for each device (each MFP) with respect to each device (each MFP 10) which is a specific-service provision object. Specifically, when an XMPP connection from the MFP 10 is established for the first time, a device management table corresponding to that MFP 10 is generated.

As shown in FIG. 3B, with respect to the corresponding MFP 10, a device management table has an item "TIMER VALUE OF INTERVAL TIMER" and an item "STATUS" associated with the device ID of the corresponding MFP 10.

An interval timer is a software timer which is used for the CPU 31 of the intermediate server 30 to perform timing according to a program, the software timer has an initial value of 150, and decreases a timer value by 1 at predetermined intervals (every 1 second in this illustrative embodiment). How to use the timer value of interval timer will be described below.

The status is information indicating whether a session between the corresponding MFP 10 and the intermediate server 30 by XMPP over BOSH (hereinafter, referred to as an XMPP session) is being maintained. According to an XMPP connection from the corresponding MFP 10 and the timer value of interval timer, etc., "ON-LINE" (maintenance of the session by XMPP over BOSH) or "OFF-LINE" (interruption of the session by XMPP over BOSH) is set, it will be described below.

(3) Schematic Operation Examples of Specific-Service Providing System 1

Figure 4A:
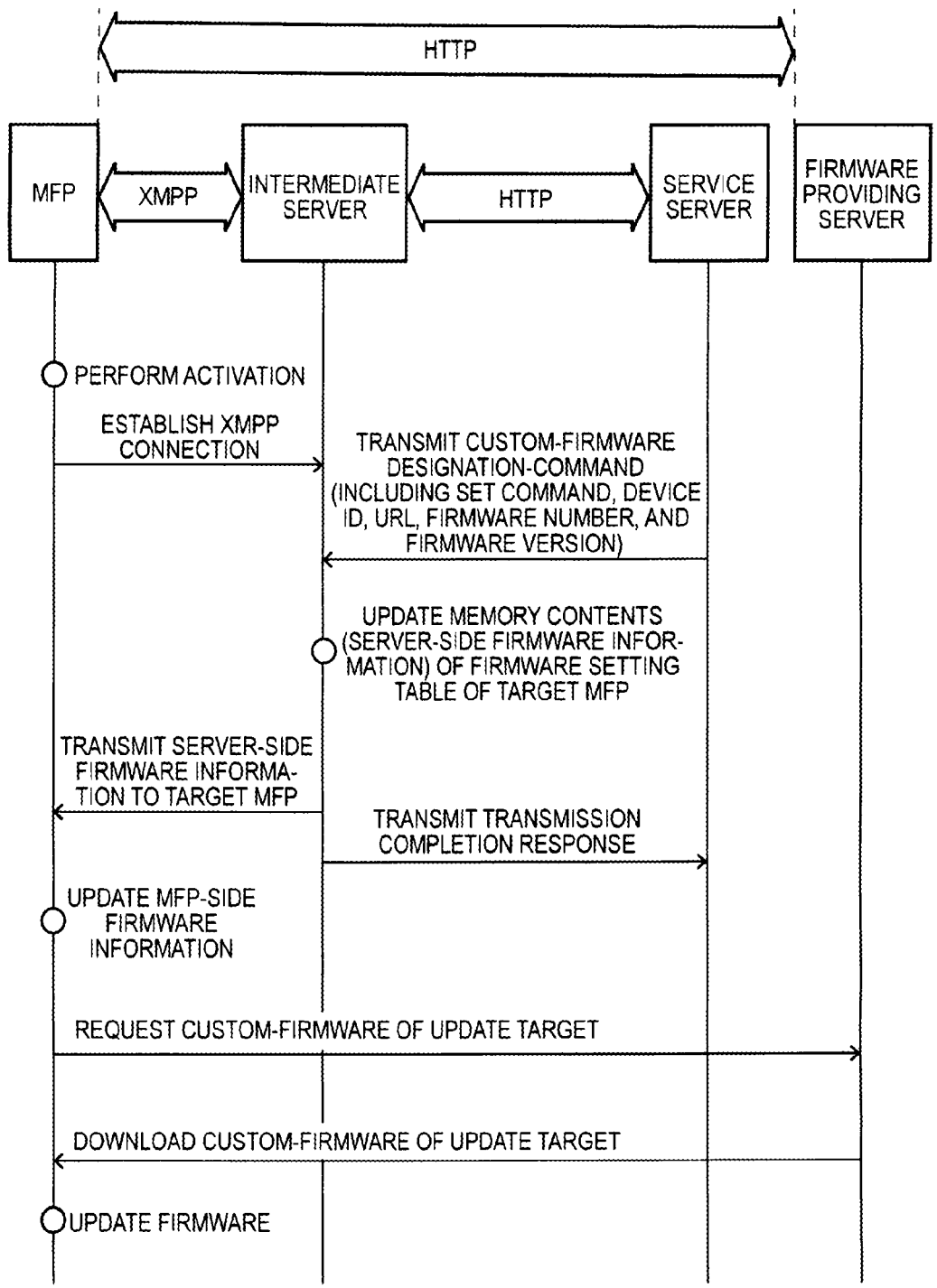
FIGS. 4A and 4B are sequence diagrams illustrating operation examples of the specific-service providing system of the illustrative embodiment.
Figure 4B:
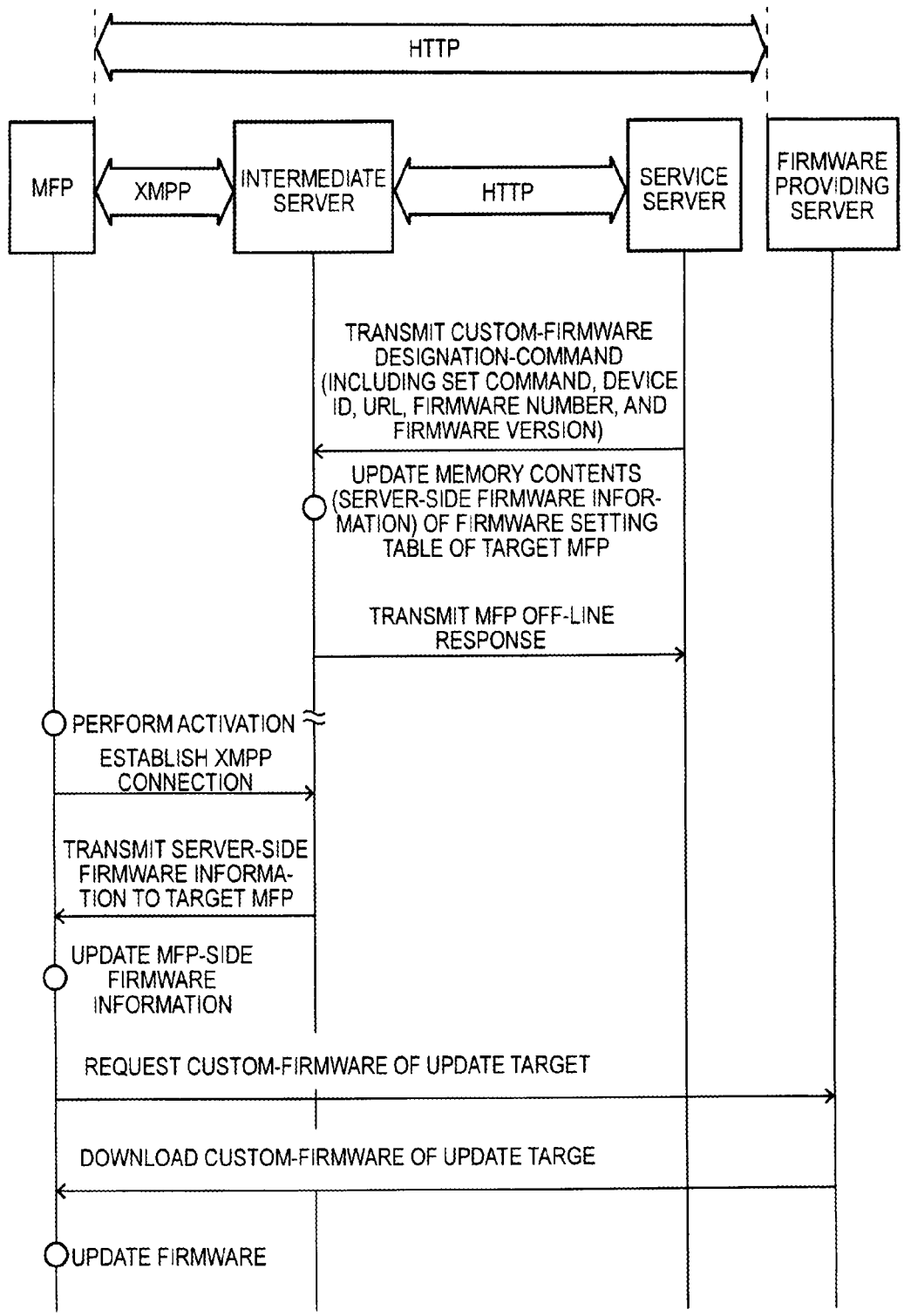

Subsequently, operation examples of the specific-service providing system 1 of this illustrative embodiment will be described with reference to FIGS. 4A and 4B. The operation examples of FIGS. 4A and 4B are for explaining the operation of the entire system, and correspond to only parts of the operation of the entire system.

First, a case where a custom-firmware designation-command is transmitted from the service server after activation of an MFP 10 will be described with reference to FIG. 4A. As shown in FIG. 4A, when the MFP 10 is activated by power supply, a session to the intermediate server 30 by XMPP over BOSH (an XMPP session) is established, so that an XMPP connection is established. The XMPP session is a session which enables server push from the intermediate server 30.

Thereafter, when the custom-firmware designation-command is transmitted from the service server 40 to the intermediate server 30 by an HTTP connection, the intermediate server 30 updates the memory contents (server-side firmware information) of the firmware setting table of a target MFP which needs to be updated to custom-firmware, based on the custom-firmware designation-command.

For example, in a case where a command in which the MFP 10 has been designated as a target MFP (a device ID has been designated) and which indicates that necessity of updating the firmware having the firmware number F2 to the latest version custom-firmware is transmitted as the custom-firmware designation-command, the firmware information (an URL and a firmware version) of the firmware number F2 in the firmware setting table of the target MFP is overwritten (or newly written).

When the firmware setting table of the target MFP is updated based on the custom-firmware designation-command received from the service server 40, the intermediate server 30 transmits the updated server-side firmware information to the target MFP through the XMPP connection and transmits a transmission completion response to the service server 40 through the HTTP connection.

When receiving the server-side firmware information from the intermediate server 30 by XMPP, the MFP 10 updates the MFP-side firmware information of the firmware state table of the MFP 10 according to the server-side firmware information. Thereafter, with respect to custom-firmware of the update target, the MFP 10 requests the latest version custom-firmware of the update target from the firmware providing server 50 through the HTTP connection, and downloads the latest version custom-firmware. After the downloading, the MFP 10 updates firmware of the update target, to the downloaded custom-firmware.

For example, in a case where the URL and firmware version of custom-firmware with respect to the firmware number F2 in the server-side firmware information from the intermediate server 30 has been updated, the MFP 10 accesses to the updated URL with respect to the firmware of the firmware number F2, downloads the custom-firmware of the designated firmware version, and updates the firmware of the firmware number F2 to the downloaded custom-firmware.

Subsequently, a case where a custom-firmware designation-command is transmitted from the service server 40 and then the MFP 10 is activated will be described with reference to FIG. 4B. As shown in FIG. 4B, when a custom-firmware designation-command is transmitted from the service server 40 through an HTTP connection before a target MFP 10 is activated, the intermediate server 30 updates the memory contents (server-side firmware information) of the firmware setting table of the target MFP which needs to be updated to custom-firmware, based on the custom-firmware designation-command, similarly in the case of FIG. 4A.

At this time, since an XMPP session has not been established yet between the intermediate server 30 and the target MFP 10, the intermediate server 30 cannot transmit the updated server-side firmware information to the target MFP 10. For this reason, in that case, the intermediate server 30 transmits an MFP off-line response to the service server 40 through the HTTP connection. Thereafter, when the target MFP 10 is activated, and an XMPP session is established such that an XMPP connection is established between the target MFP 10 and the intermediate server 30, the intermediate server 30 transmits the server-side firmware information to the target MFP 10 through the XMPP connection. The operation of the target MFP 10 after the server-side firmware information is transmitted from the intermediate server 30 to the target MFP 10 is the same as that of FIG. 4A.

(4) Description of Service Processing by Service Server 40

Figure 5:
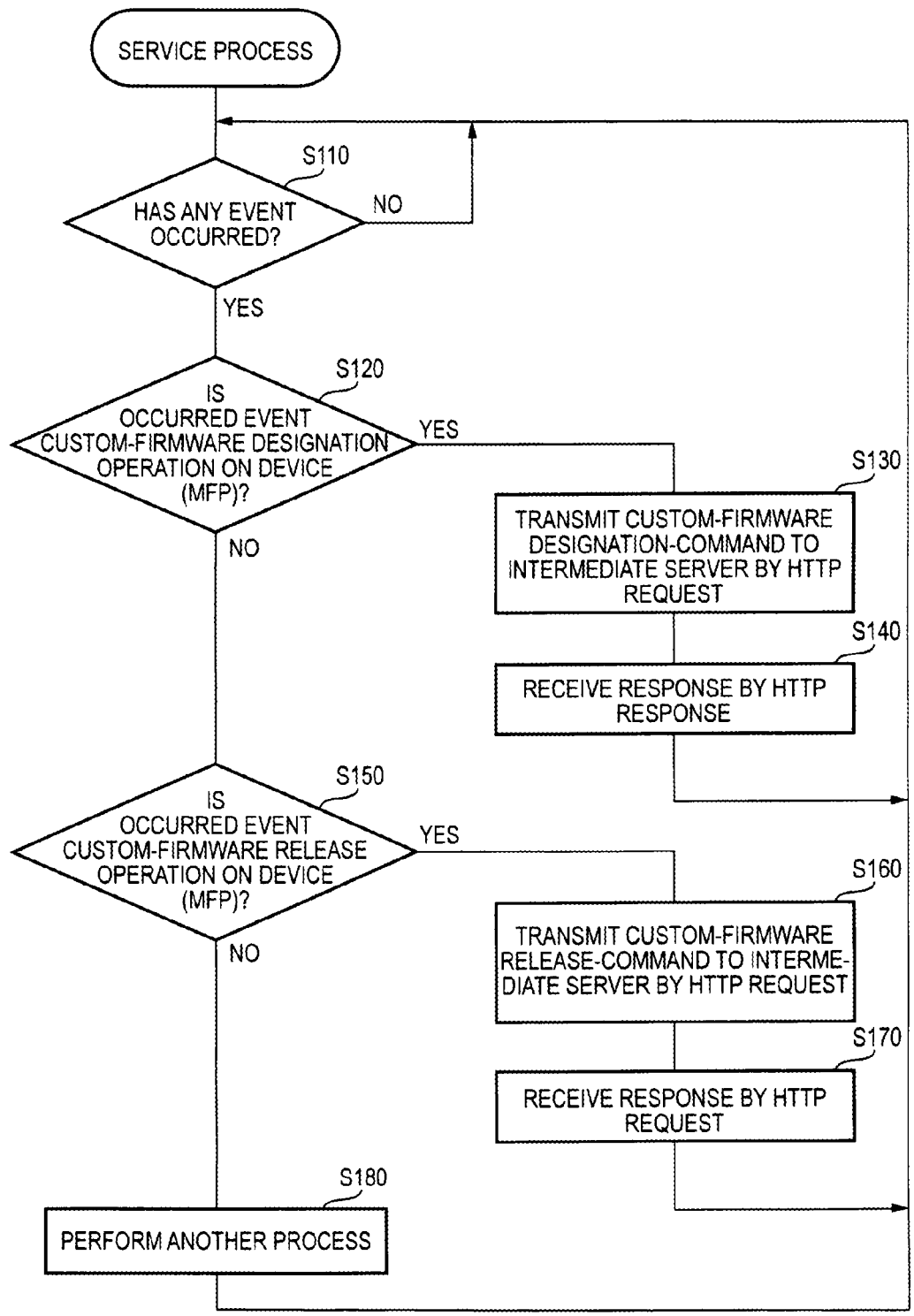
FIG. 5 is a flow chart illustrating a service processing, which is performed by a service server.

Subsequently, a service processing which is performed by the service server 40 will be described with reference to FIG. 5. When the service processing of FIG. 5 starts, in Step S110, the service server 40 determines whether any event has occurred. In a case where an event has occurred, in Step S120, the service server 40 determines whether the occurred event is a custom-firmware designation operation on a device (specifically, an MFP 10 which is a specific-service provision object) by an operator or the like.

In a case where the occurred event is a custom-firmware designation operation by an operator or the like, in Step S130, the service server 40 transmits a custom-firmware designation-command according to the contents of the custom-firmware designation operation, to the intermediate server 30 by an HTTP request. After the transmitting, when receiving a response (a transmission completion response or an MFP off-line response) from the intermediate server 30 by an HTTP response, the service server 40 returns to Step S110.

In a case where it is determined in Step S120 that the occurred event is not a custom-firmware designation operation, in Step S150, the service server 40 determines whether the occurred event is a custom-firmware release operation on a device by an operator or the like. In a case where the occurred event is a custom-firmware release operation by an operator or the like, in Step S160, the service server 40 transmits a custom-firmware release-command according to the contents of that custom-firmware release operation, to the intermediate server 30 by an HTTP request. After the transmitting of the custom-firmware release-command, when receiving a response (a transmission completion response or an MFP off-line response) from the intermediate server 30 by an HTTP response in Step S170, the service server 40 returns to Step S110.

In a case where it is determined in Step S150 that the occurred event is not a custom-firmware release operation, the service server 40 performs another processing (a processing according to the occurred event) in Step S180, and then returns to Step S110.

(5) Description Intermediate Server Processing and Interval Timer Processing by Intermediate Server 30

Figure 6A:
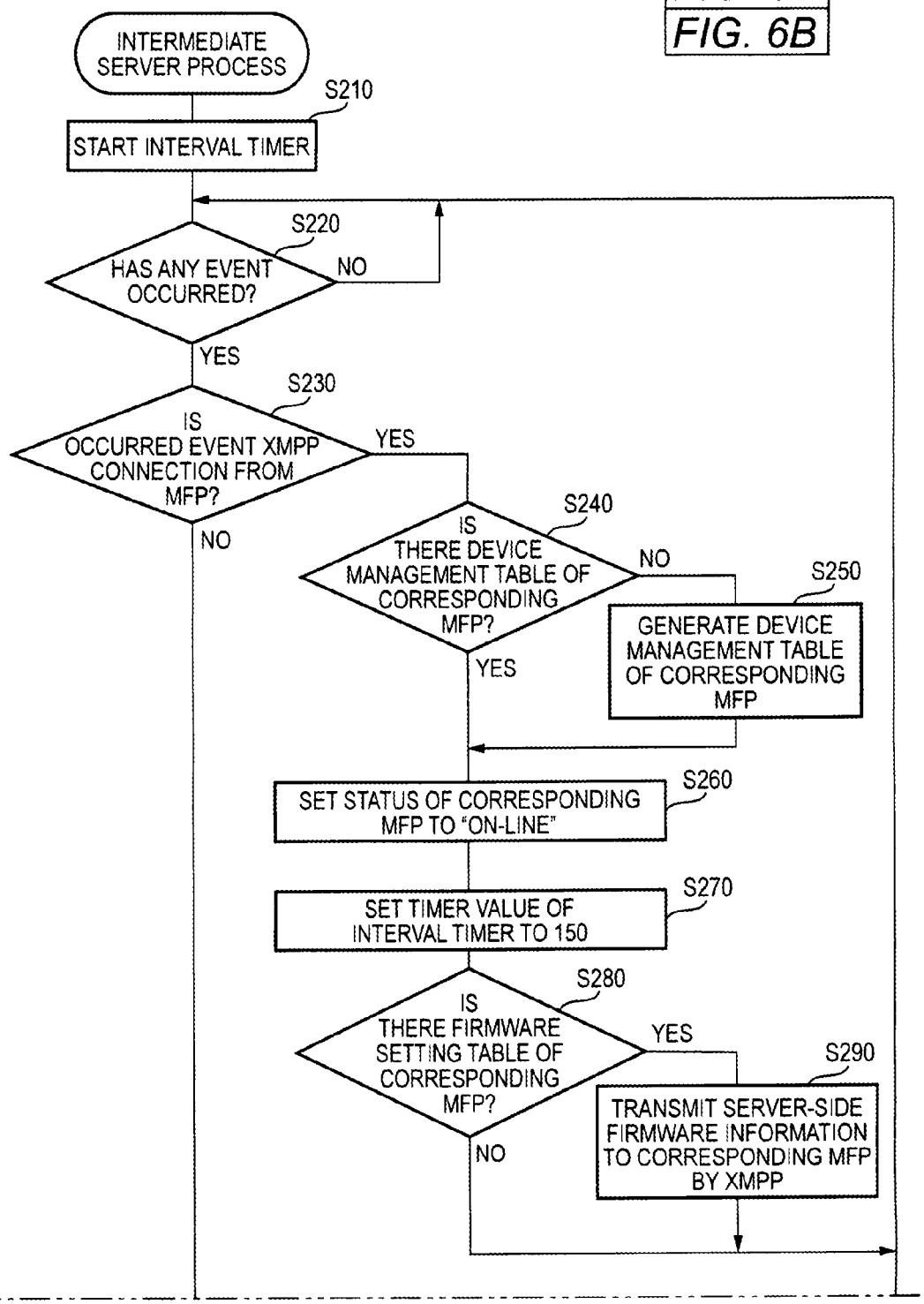
FIG. 6, which is composed of FIGS. 6A and 6B, is a flow chart illustrating an intermediate server processing, which is performed by the intermediate server.
Figure 6B:
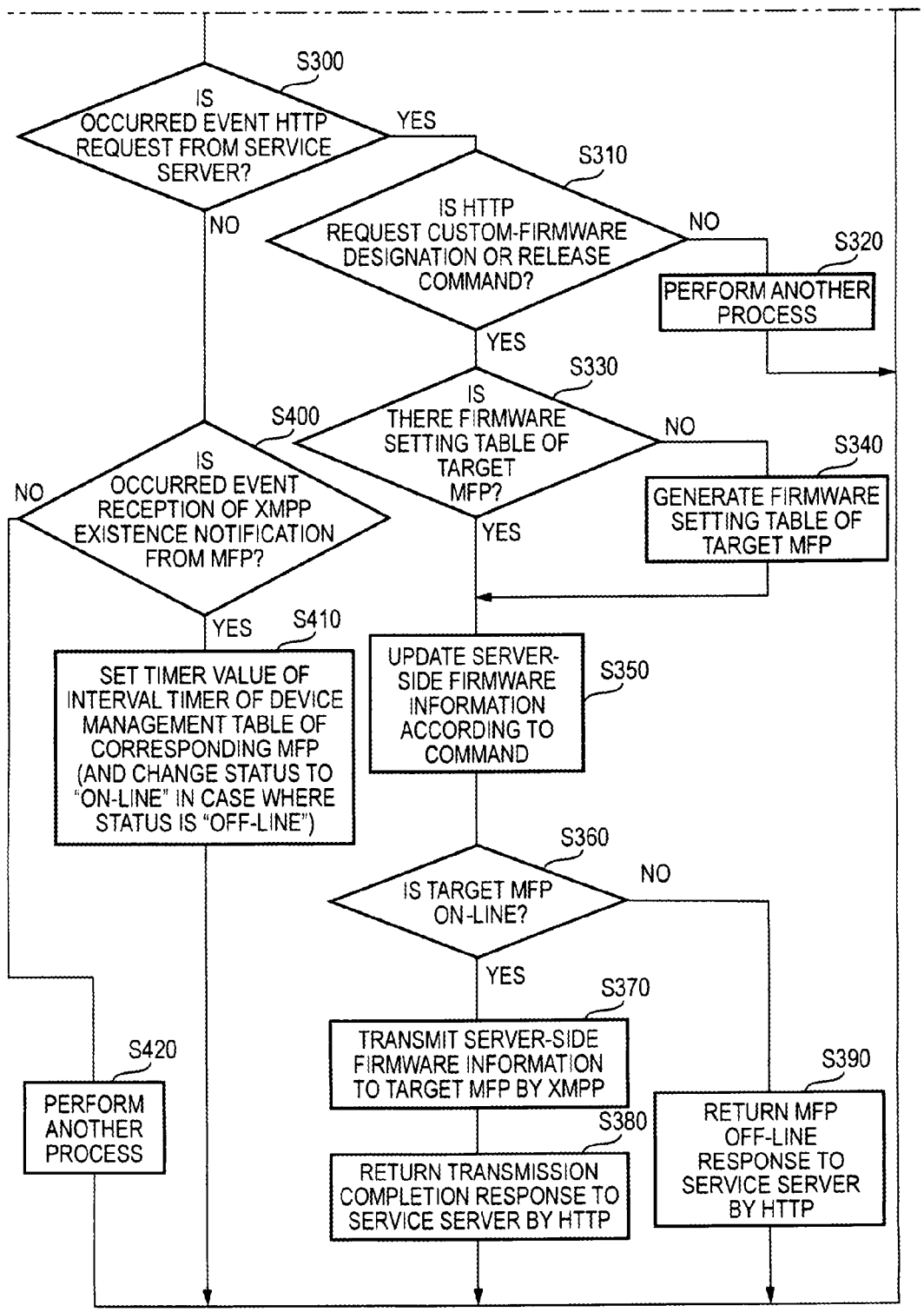

Subsequently, an intermediate server processing which is performed by the intermediate server 30 will be described with reference to FIG. 6, which is composed of FIGS. 6A and 6B. When power is supplied and the CPU 31 of the intermediate server 30 starts operation, the CPU 31 reads a program for the intermediate server processing of FIG. 6 from the HDD 34, and executes the read program.

When the intermediate server processing of FIG. 6 starts, the CPU 31 of the intermediate server 30 starts the interval timer in Step S210. The interval timer of this illustrative embodiment is a software timer, and specifically starts the interval timer processing of FIG. 7. When it is instructed to start the interval timer in Step S210 of the intermediate server processing, the CPU 31 of the intermediate server 30 reads the program for the interval timer processing of FIG. 7 from the HDD 34, and repeatedly executes the program at predetermined intervals (every 1 second in this illustrative embodiment). This interval timer processing is performed in parallel to the intermediate server process.

Figure 7:
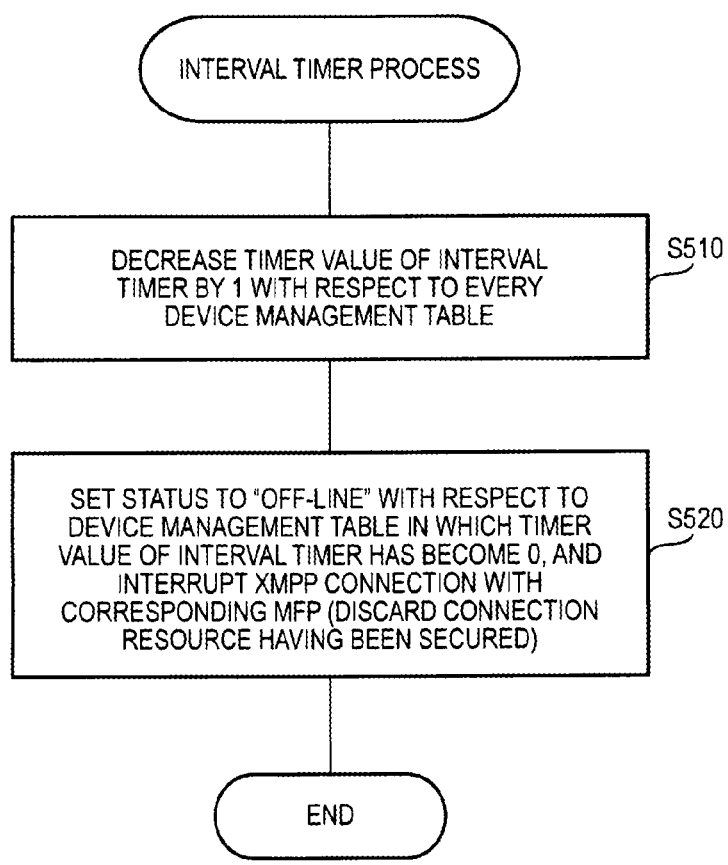
FIG. 7 is a flow chart illustrating an interval timer processing, which is performed by the intermediate server.

When the interval timer processing of FIG. 7 starts, in Step S510, the CPU 31 of the intermediate server 30 decreases the timer value of the interval timer by 1 for all of generated device management table. As described above, the timer value of the interval timer in each device management table is set to 150 in an initial state. Therefore, when the interval timer processing of FIG. 7 starts, every time 1 second elapses, the timer value of the interval timer of each table decreases from 150 to 149, 148 . . . sequentially.

In Step S520, with respect to a device management table in which the value of the timer value of the interval timer has become 0, the CPU 31 sets the status to "OFF-LINE" and interrupts an XMPP connection with a corresponding MFP. Specifically, a connection resource secured for maintaining the XMPP session with the corresponding MFP is discard. That is, in this illustrative embodiment, in a case where access from an MFP 10 by XMPP has been performed for a predetermined time (150 seconds in this illustrative embodiment), with respect to that MFP 10, the CPU 31 determines that the corresponding MFP 10 has become an off-line state.

However, as will be described below, from each MFP 10, an XMPP existence notification is transmitted regularly (every 120 seconds in this illustrative embodiment), and every time an XMPP existence notification is received from an MFP 10, in the processing of Step S410 (to be described below), the intermediate server 30 initializes the value of the timer value of the interval timer of the corresponding MFP 10 to 150. Therefore, while an XMPP existence notification is received regularly from an MFP 10, a corresponding XMPP session is maintained. Also, although the value of the timer value of the interval timer has become 0 due to any factor, and a corresponding MFP 10 has become off-line, thereafter, when an XMPP existence notification is received from the corresponding MFP 10, the status is set to "ON-LINE" again, and the value of the timer value of the interval timer is initialized to 150.

Referring to FIG. 6A again, the description of the intermediate server processing will continue. When the interval timer starts in Step S210, in Step S220, the CPU 31 determines whether any event has occurred. In a case where an event has occurred, in Step S230, the CPU 31 determines whether the occurred event is an XMPP session request for XMPP connection from an MFP 10. In a case where the occurred event is an XMPP connection from an MFP 10, the CPU 31 establishes an XMPP connection with the corresponding MFP 10 secures a connection resource, and then proceeds to Step S240.

In Step S240, the CPU 31 determines whether there is the device management table of the corresponding MFP 10 connected by XMPP, that is, whether the device management table of the corresponding MFP 10 has been already generated in the HDD 34. In a case where the device management table already generated, the CPU 31 proceeds to Step S260. Meanwhile, in a case where the device management table has not been generated, the CPU 31 generates the device management table of the corresponding MFP 10 in Step S250, and then proceeds to Step S260.

In Step S260, the CPU 31 sets the status of the device management table of the corresponding MFP 10 to "ON-LINE". In Step S270, the CPU 31 sets the value of the timer value of the interval timer of the device management table of the corresponding MFP 10 to 150.

In Step S280, the CPU 31 determines whether there is the firmware setting table of the corresponding MFP 10, that is, whether the firmware setting table of the corresponding MFP 10 has been already generated in the HDD 34. In a case where the firmware setting table of the corresponding MFP 10 has not been generated, the CPU 31 returns to Step S220. Meanwhile, in a case where the firmware setting table of the corresponding MFP 10 has been generated, the CPU 31 transmits the server-side firmware information included in the firmware setting table to the corresponding MFP 10 by XMPP, in Step S290, and then returns to Step S220. In this specification, "by XMPP" means "through an XMPP connection", and "by HTTP" means "through an HTTP connection".

In a case where it is determined in Step S230 that the occurred event is not an XMPP connection from an MFP 10, in Step S300, the CPU 31 determines whether the occurred event is an HTTP request from the service server 40 through an HTTP connection. In a case where the occurred event is an HTTP request from the service server 40, in Step S310, the CPU 31 determines whether that HTTP request is a custom-firmware designation-command or a custom-firmware release-command.

In a case where the HTTP request is not any one of those commands, the CPU 31 performs another processing, that is, a processing according to the HTTP request, in Step S320, and then returns to Step S220.

In a case where the HTTP request is any one of those commands, the CPU 31 performs a series of processes of Steps S330 to S390 for each target MFP 10 designated by the corresponding command. That is, although not shown in FIG. 6, the series of processes of Steps S330 to S390 is performed individually for each of one or more target MFPs 10 designated in the custom-firmware designation-command (or the custom-firmware release-command) acquired from the service server 40 by HTTP.

In Step S330, with respect to one target MFP 10 of the MFPs 10 designated by the command, the CPU 31 determines whether there is the firmware setting table of the target MFP 10. In a case where there is the firmware setting table of the target MFP 10, the CPU 31 proceeds to Step S350. Meanwhile, in a case where the firmware setting table of the target MFP 10 does not generated, the CPU 31 generates the firmware setting table of the target MFP 10 in Step S340, and then proceeds to Step S350.

In Step S350, the CPU 31 updates the server-side firmware information of the firmware setting table of the target MFP 10 according to the contents of the command from the service server 40. For example, in a case where the URL and firmware version of the custom-firmware of the firmware number F1 or F2 is notified by a custom-firmware designation-command, the CPU 31 rewrites the URL and firmware version of the firmware number F1 or F2 included in the firmware setting table, to the notified URL and firmware version. Also, for example, in a case where a custom-firmware release-command designating the custom-firmware of the firmware number F1 is notified, the CPU 31 deletes the URL and firmware version of the firmware number F1 included in the firmware setting table.

In Step S360, the CPU 31 determines whether the target MFP 10 has been set to "OFF-LINE" in the device management table. In a case where the target MFP 10 has been set to "OFF-LINE", the CPU 31 returns an MFP off-line response relating to the target MFP 10 to the service server 40 by HTTP, in Step S390, and then returns to Step S220.

In a case where the target MFP 10 has been set to "ON-LINE", in Step S370, the CPU 31 transmits the server-side firmware information included in the firmware setting table, to the target MFP 10 by XMPP. Thereafter, the CPU 31 returns a transmission completion response relating to the target MFP 10 to the service server 40 by HTTP, in Step S380, and then returns to Step S220.

In a case where it is determined in Step S300 that the occurred event is not an HTTP request from the service server 40, in Step S400, the CPU 31 determines whether the occurred event is reception of an XMPP existence notification from any MFP 10. The XMPP existence notification is received regularly from each MFP 10 by XMPP. In a case where the occurred event is not reception of an XMPP existence notification from an MFP 10, the CPU 31 performs another processing, that is, a processing according to the event, in Step S320, and then returns to Step S220.

In a case where the occurred event is reception of an XMPP existence notification from the MFP 10, the CPU 31 sets (that is, initializes) the value of the timer value of the interval timer of the device management table of the corresponding MFP 10 to 150 in Step S410, and then returns to Step S220. Also, in Step S410, in a case where the status of the device management table of the corresponding MFP 10 is "OFF-LINE", the CPU 31 also performs a processing of changing the status to "ON-LINE".

(6) Description of MFP Processing by MFP 10

Figure 8B:
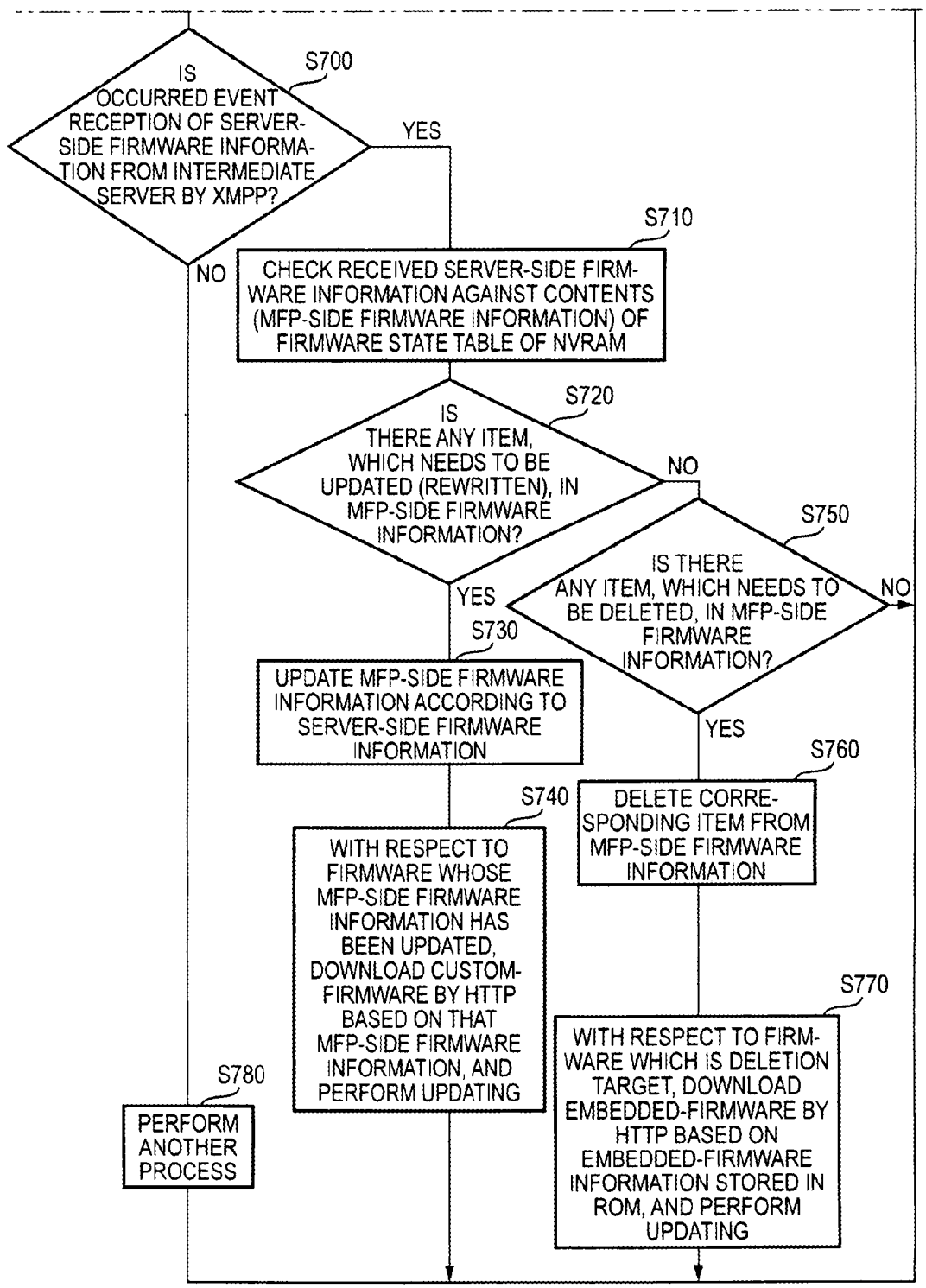
FIG. 8, which is composed of FIGS. 8A and 8B, is a flow chart illustrating an MFP processing, which is performed by the MFP.

Subsequently, an MFP processing which is performed by an MFP 10 will be described with reference to FIG. 8, which is composed of FIGS. 8A and 8B. When power is supplied and the CPU 11 of the MFP 10 starts operation, the CPU 11 reads a program for the MFP processing of FIG. 8 from the ROM 12 or the NVRAM 14, and executes the read program.

When the MFP processing of FIG. 8 starts, in Step S610, the CPU 11 of the MFP 10 establishes an XMPP connection with the intermediate server. Specifically, the CPU 11 establishes an XMPP session between the MFP 10 and the intermediate server 30 by XMPP over BOSH which is a constant connection type protocol, whereby the XMPP connection is established.

The specific procedure for establishing the XMPP session will be described. In a case where the power supply of the corresponding MFP 10 changes from an OFF state to an ON state, the MFP 10 transmits a first request signal (that is, an HTTP request) of BOSH (an abbreviation for bidirectional-streams over synchronous HTTP) to the intermediate server 30. The first request signal is a signal for requesting the intermediate server 30 to transmit a session ID to be used by the XMPP session.

In a case where the first request signal is received from the MFP 10, the intermediate server 30 generates a session ID, and transmits a response signal (that is, an HTTP response) including the session ID to the MFP 10.

In a case where the response signal is received from the intermediate server 30, the MFP 10 transmits a second request signal (that is, an HTTP request) of BOSH to the intermediate server 30. The second request signal includes a session ID coinciding with the session ID included in the response signal. The second request signal is a signal for requesting the intermediate server 30 to establish the XMPP session.

In a case where the second request signal including the session ID is received from the MFP 10, the intermediate server 30 transmits a response signal indicating "OK" (that is, an HTTP response) to the MFP 10. Therefore, the MFP 10 and the intermediate server 30 perform communications of a variety of signals such as an authentication signal for establishing the XMPP session and a response signal, thereby establishing the XMPP session.

In a case where the XMPP session is established, the MFP 10 transmits a third request signal (that is, an HTTP request) of BOSH to the intermediate server 30. The third request signal includes the above described session ID. The third request signal is a signal to be a base for transmitting a response signal including data (for example, a set command) which needs to be transmitted from the intermediate server 30 to the MFP 10.

When there is a set command which needs to be transmitted to the MFP 10 when the third request signal is received from the MFP 10, the intermediate server 30 transmits the corresponding set command to the MFP 10, as a response signal (that is, an HTTP response) to the third request signal. However, when there is no set command which needs to be transmitted to the MFP 10 when the third request signal is received from the MFP 10, the intermediate server 30 does not transmit any set command to the MFP 10 until a set command is received from the service server 40. A request signal of BOSH has a timeout time longer than that of a request signal of normal HTTP other than BOSH. Therefore, even if a time from when the third request signal is received to when a set command (that is, a response signal) is transmitted is long, the intermediate server 30 can appropriately transmit the set command without determining a timeout. Also, the router 20 allows transmission of the set command from the Internet side (that is, the intermediate server 30) to the LAN side (that is, the MFP 10), without determining as a timeout.

In a case where it is determined that the XMPP session has been established between the MFP 10 and the intermediate server 30, the intermediate server 30 transmits a set command to the MFP 10, as a response signal to the third request signal. The corresponding response signal does not include the above described session ID. However, since the corresponding response signal is a response signal to the third request signal (that is, the third request signal conveyed by the XMPP session) including the above described session ID, it can be said that the corresponding response signal is a signal conveyed by the XMPP session.

In Step S620, the CPU 11 starts the timer. This timer is a software timer which generates a timer interruption every time a predetermined time elapses (every 120 seconds in this illustrative embodiment).

In Step S630, the CPU 11 determines whether any event has occurred. In a case where an event has occurred, in Step S640, the CPU 11 determines whether the occurred event is a timer interruption. In a case where the occurred event is a timer interruption, the CPU 11 transmits an XMPP existence notification to the intermediate server 30 by XMPP, in Step S650, and then returns to Step S630. In a case where the occurred event is not a timer interruption, the CPU 11 proceeds to Step S660.

In Step S660, the CPU 11 determines whether the occurred event is a firmware updating request from the PC 18. A user or the like can use the PC 18 to designate any one MFP 10 and transmit a firmware updating request for updating a part or all of the firmware of the designated MFP 10 with the latest version, at arbitrary timings. In Step S660, the CPU 11 determines whether the occurred event is a firmware updating request from the PC 18.

In a case where it is determined in Step S660 that the occurred event is a firmware updating request from the PC 18, in Step S670, with respect to firmware requested to be updated, the CPU 11 determines whether MFP-side firmware information has been stored in the firmware state table. In a case where MFP-side firmware information has been stored with respect to the requested firmware, in Step S680 the CPU 11 downloads custom-firmware of the requested firmware from the firmware providing server 50 by HTTP based on the stored MFP-side firmware information (an URL and a firmware version), and updates the requested firmware to that custom-firmware. In a case where MFP-side firmware information has not been stored with respect to the requested firmware, in Step S690, based on embedded-firmware information (an URL) stored in the ROM 12, the CPU 11 downloads embedded-firmware of the requested firmware from the firmware providing server 50 by HTTP, and updates the requested firmware with the embedded-firmware. After the updating of the firmware in Step S680 or S690, the CPU 11 returns to Step S630.

In a case where it is determined in Step S660 that the occurred event is not a firmware updating request from the PC 18, in Step S700, the CPU 11 determines whether the occurred event is reception of server-side firmware information from the intermediate server 30 by XMPP. In a case where the occurred event is not reception of server-side firmware information from the intermediate server 30, the CPU 11 performs another processing, that is, a processing according to the occurred event, in Step S780, and then returns to Step S630.

In a case where it is determined in Step S700 that the occurred event is reception of server-side firmware information from the intermediate server 30, in Step S710, the CPU 11 checks the received server-side firmware information against the contents (the MFP-side firmware information) of the firmware state table stored in the NVRAM 14 of the corresponding MFP 10.

In Step S720, based on the check result in Step S710, the CPU 11 determines whether there is any item, which needs to be updated (overwritten), in the MFP-side firmware information, that is, whether server-side firmware information indicating an URL and a firmware version different from those of the MFP-side firmware information has been received. In a case where there is an item which needs to be updated (overwritten) with a different URL and a different firmware version, in Step S730, the CPU 11 updates the MFP-side firmware information of the firmware state table according to the received server-side firmware information.

Thereafter, in Step S740, with respect to firmware which is included in the three kinds of firmware and whose MFP-side firmware information has been updated in Step S730, the CPU 11 downloads custom-firmware of the firmware of an update target from the firmware providing server 50 by HTTP based on the updated MFP-side firmware information (the URL and the firmware version updated) and updates the firmware to the custom-firmware.

In a case where it is determined in Step S720 that there is no item, which needs to be updated (overwritten), in the MFP-side firmware information, in Step S750, based on the check result in Step S710, the CPU 11 determines whether there is any item, which needs to be deleted, in the MFP-side firmware information, that is, whether the URL and firmware version of the custom-firmware has been stored in the MFP-side firmware information and has been deleted in the received server-side firmware information.

In a case where there is no item, which needs to be deleted, in the MFP-side firmware information, since it can be determined that the contents of the MFP-side firmware information is the same as the received server-side firmware information, the CPU 11 returns to Step S630. In the case where there are items, which needs to be deleted, in the MFP-side firmware information, in Step S760, the CPU 11 deletes the corresponding items (the URL and firmware version of a corresponding firmware number) from the MFP-side firmware information.

Thereafter, in Step S770, with respect to firmware which is included in the three kinds of firmware and whose items have been deleted from the MFP-side firmware information, the CPU 11 downloads embedded-firmware from the firmware providing server 50 by HTTP based on the embedded-firmware information stored in the ROM 12, and performs updating to that embedded-firmware. After the updating of the firmware in Step S740 or S770, the CPU 11 returns to Step S630.

(7) Effects and Others of Illustrative Embodiment

As described above, in the specific-service providing system 1 of this illustrative embodiment, a constant connection type XMPP connection is established between the intermediate server 30 and each MFP 10, and a request-response type HTTP connection is established between the intermediate server 30 and the service server 40. Thereafter, when a custom-firmware designation-command or a custom-firmware release-command is transmitted from the service server 40 to the intermediate server through the HTTP connection, the intermediate server 30 transmits server-side firmware information according to the contents of the received command, to an MFP 10 designated by the received command, through an XMPP connection. When receiving the server-side firmware information addressed to the MFP 10 and transmitted from the intermediate server 30, according to the contents of the server-side firmware information, the MFP 10 performs updating of custom-firmware.

Specifically, when a custom-firmware designation-command indicating that firmware having a certain firmware number needs to be updated to custom-firmware is transmitted from the service server 40 and server-side firmware information according to that command is transmitted from the intermediate server 30, with respect to the firmware which needs to be changed, the MFP 10 downloads and updates the custom-firmware based on an URL and a firmware version included in the server-side firmware information received from the intermediate server 30 and updates to the custom-firmware.

Therefore, a custom-firmware designation-command is transmitted from the service server 40 as necessary, whereby it is possible to appropriately and efficiently update firmware of each MFP 10, which is a specific-service provision object, to the custom-firmware.

Also, when a custom-firmware release-command indicating necessity of returning firmware having a certain firmware number from the custom-firmware to embedded-firmware is transmitted from the service server 40 and server-side firmware information according to that command is transmitted from the intermediate server 30, with respect to the firmware which needs to be returned to the embedded-firmware the MFP 10 downloads the embedded-firmware based on the embedded-firmware information of the ROM 12, and updates to the embedded-firmware.

Therefore, a custom-firmware release-command is transmitted from the service server 40 as necessary, whereby it is possible to efficiently perform returning to embedded-firmware with respect to firmware whose custom-firmware has become unnecessary, at an appropriate timing.

Also, every time receiving the custom-firmware designation-command or the custom-firmware release-command from the service server 40, the intermediate server 30 rewrites the contents (server-side firmware information) of the firmware setting table of each MFP 10 based on the contents of the received command. Therefore, when an XMPP connection is established between an MFP 10 and the intermediate server 30, it is possible to transmit server-side firmware information which is the latest at that time, to the MFP 10, and make the firmware of the MFP 10 the latest state.

Also, even in each MFP 10, every time server-side firmware information is received from the intermediate server 30, the contents of the received server-side firmware information is reflected to MFP-side firmware information included in the firmware state table of the corresponding MFP 10. Therefore, in a case where there is a firmware updating request received from the PC 18, with respect to custom-firmware, it is possible to acquire the latest version custom-firmware based on the contents of the firmware state table.

Even in embedded-firmware, embedded-firmware information is stored in the ROM 12 in advance. Therefore, in a case where a firmware updating request is received from the PC 18, it is possible to acquire the latest version embedded-firmware based on the embedded-firmware information of the ROM 12.

That is, in MFP 10, the firmware state table relating to custom-firmware is stored in the NVRAM 14 and is appropriately updated according to the server-side firmware information from the intermediate server 30, and embedded-firmware information is stored in the ROM 12 in advance. Therefore, it is possible to maintain the firmware of each MFP 10 for contents of the specific service based on the firmware state table and the embedded-firmware information, and appropriately enjoy the specific service.

Also, an XMPP session is maintained between each MFP 10 and the intermediate server 30. Therefore, each MFP 10 can respond to server-side firmware information from the intermediate server 30 in real time, and maintain the firmware at the desired latest state.

Also, in this illustrative embodiment, an MFP 10 corresponds to an example of an information processing apparatus of this disclosure, the intermediate server 30 corresponds to an example of a relay server of this disclosure, the service server 40 corresponds to an example of a specific server of this disclosure, the HDD 34 of the intermediate server 30 corresponds to an example of a storage of this disclosure, the NVRAM 14 of an MFP 10 corresponds to an example of a first storage of this disclosure, and the ROM 12 of an MFP 10 corresponds to an example of a second storage of this disclosure. Further, custom-firmware corresponds to an example of specific firmware of this disclosure, the URL of custom-firmware corresponds to an example of specific-firmware location-information of this disclosure, the URL of embedded-firmware corresponds to an example of embedded-firmware location-information of this disclosure, a device ID corresponds to an example of apparatus information of this disclosure, server-side firmware information corresponds to an example of specific-firmware-information of this disclosure, transmission of an XMPP existence notification by an MFP 10 corresponds to an example of a communication maintaining processing of this disclosure, a custom-firmware designation-command is an example of a specific-firmware update-command of this disclosure, and a custom-firmware release-command corresponds to an example of a specific-firmware release-command of this disclosure. Furthermore, server-side firmware information, which is transmitted from the intermediate server 30 to an MFP 10 in order to return firmware to embedded-firmware and from which a URL and a firmware version corresponding to that firmware have been deleted, corresponds to an example of release information of this disclosure.

Other Illustrative Embodiments (1) In a case where each command is received from the service server 40, the intermediate server 30 transmits server-side firmware information according to the received command that is information including all of the information of the three kinds of firmware. However, the intermediate server 30 may not necessarily transmit the information of all of three kinds of firmware.

For example, in a case where a custom-firmware designation-command indicating that custom-firmware needs to be updated with respect to the firmware having the firmware number F1 is transmitted from the service server 40, with respect to only the custom-firmware of the firmware number F1 which is the update target, the intermediate server 30 may transmit the URL and firmware version of the corresponding custom-firmware to a corresponding MFP 10.

Also, for example, in a case where a custom-firmware release-command indicating necessity of returning the firmware having the firmware number F1 from custom-firmware to embedded-firmware is received from the service server 40, with respect to only the firmware of the firmware number F1 which needs to be returned to the embedded-firmware, the intermediate server 30 may transmit information indicating necessity of returning the firmware of the firmware number F1 to the embedded-firmware, to a corresponding MFP 10.

As a result, the intermediate server 30 can recognize the latest information of the service server 40 relating to custom-firmware (that is, which firmware of which MFP 10 needs to be updated with which version of custom-firmware, or which firmware of which MFP 10 needs to be returned to embedded-firmware). As long as it possible to transmit that latest information to each MFP 10 as necessary, it is possible to appropriately determine a specific method for holding and storing a variety of information in the intermediate server 30 and timings to transmit a variety of information to each MFP 10.

From a viewpoint of the MFP (10) side, as long as it is possible to appropriately notify which firmware of the corresponding MFP 10 needs to be processed (whether firmware needs to be changed to custom-firmware or embedded-firmware, where it is possible to acquire custom-firmware in a case where a piece of firmware needs to be changed to the custom-firmware, and so on), it is possible to appropriately determine the specific configuration the corresponding MFP 10 and the intermediate server 30.

(2) In the above described illustrative embodiment, a case where the number of kinds of firmware of each MFP 10 is three has been described. However, the number of kinds of firmware is not limited thereto. The number of kinds of firmware may be one, or may be four or more.

(3) It may be not needed to interpose the intermediate server 30 between the service server 40 and each MFP 10. A command may be transmitted from the service server 40 directly to each MFP 10 for updating firmware. However, in that case, it is necessary to appropriately generate a situation in which it is possible to transmit a command from the service server 40 directly to each MFP 10, for example, by using each MFP 10 to constantly access the service server 40 and acquire the command, or by establishing an XMPP session between each MFP 10 and the service server 40.

What is claimed is:

1. An information processing apparatus comprising:
a communication unit configured to perform communication with a specific-firmware-information transmitting apparatus and a firmware providing server through a network; and
a control device, when executing processor-executable instructions, configured to:
establish a session, between the information processing apparatus and the specific-firmware-information transmitting apparatus, according to a first communication protocol enabling server push from the specific-firmware-information transmitting apparatus;
establish a first connection, between the information processing apparatus and the specific-firmware-information transmitting apparatus, in the established session;
acquire specific-firmware-information from the specific-firmware-information transmitting apparatus through the first connection, wherein the specific-firmware-information includes at least specific-firmware location-information indicating a location of a specific firmware to update a firmware of the information processing apparatus to the specific firmware;
acquire the specific firmware from the firmware providing server indicated by the specific-firmware location-information, based on the specific-firmware location-information included in the acquired specific-firmware-information, through a second connection with the firmware providing server according to a second communication protocol different from the first communication protocol; and
update the firmware included in the information processing apparatus with the acquired specific firmware,
wherein the specific-firmware-information transmitting apparatus is configured to:
establish a third connection according to a third communication protocol different from the first communication protocol, between the specific-firmware-information transmitting apparatus and a specific server,
acquire a specific-firmware update-command from the specific server through the third connection, wherein the specific-firmware update-command is configured to update firmware of the information processing apparatus, and
transmit by the specific-firmware-information transmitting apparatus the specific-firmware-information to the information processing apparatus through the first connection based on the acquired specific firmware update command, and
wherein the first communication protocol is a communication protocol to continuously or intermittently maintain the session between the information processing apparatus and the specific-firmware-information transmitting apparatus, and the second communication protocol is a request-response protocol that has a form in which responses are transmitted with respect to requests to establish the second connection between the information processing apparatus and the firmware providing server.

2. The information processing apparatus according to claim 1, further comprising
a first storage configured to store information,
wherein the control device is further configured to:
store the acquired specific-firmware-information in the first storage; and
receive an update request of the firmware, and
wherein when the update request is received, the control device is further configured to acquire the specific firmware based on the specific-firmware-information stored in the first storage.

3. The information processing apparatus according to claim 2, further comprising
a second storage, in which embedded-firmware location-information indicating a location of particular embedded-firmware corresponding to the firmware of the information processing apparatus is stored,
wherein the control device is configured to:
determine, when the update request is received, whether the specific-firmware-information corresponding to firmware that is a target of the update request has been stored in the first storage;
acquire, when the specific-firmware-information have not been stored in the first storage, the embedded-firmware from the firmware providing server indicated by the embedded-firmware location-information corresponding to the firmware that is the target of the update request and stored in the second storage; and
update the firmware that is the target of the update request, to the acquired embedded-firmware.

4. The information processing apparatus according to claim 2, further comprising:
a second storage in which embedded-firmware location-information indicating a location of particular embedded-firmware corresponding to the firmware of the information processing apparatus is stored, wherein the control device is configured to:
acquire release information through the first connection, wherein the release information is transmitted to the information processing apparatus from the specific-firmware-information transmitting apparatus for returning the specific firmware of the information processing apparatus to particular embedded-firmware;
acquire, when the release information is acquired, the embedded-firmware from the firmware providing server indicated by the embedded-firmware location-information corresponding to the release information stored in the second storage; and
update the acquired embedded-firmware corresponding to the release information.

5. The information processing apparatus according to claim 4, wherein when the release information is acquired, the control device is further configured to delete the specific-firmware-information of the specific firmware stored in the first storage and corresponding to the release information.

6. The information processing apparatus according to claim 1, wherein the communication protocol is XMPP over BOSH (eXtensible Messaging and Presence Protocol over Bidirectional-streams Over Synchronous HTTP).

7. A relay server comprising:
a communication unit configured to perform communication with a specific server and at least one information processing apparatus through a network; and
a control device, when executing processor-executable instructions, configured to:
establish, in response to a request from the information processing apparatus, a first connection between the relay server and the information processing apparatus when a session according to a first communication protocol enabling server push from the relay server is established;
establish a second connection according to a second communication protocol different from the first communication protocol, between the relay server and the specific server;
acquire a specific-firmware update-command from the specific server through the second connection, wherein the specific-firmware update-command is to update firmware of a particular update target apparatus of the at least one information processing apparatus to with specific firmware from a firmware providing server and includes at least apparatus information indicating the update target apparatus and specific-firmware location-information indicating a location of the specific firmware; and
transmit specific-firmware-information including at least the specific-firmware location-information, to the update target apparatus through the first connection based on the acquired specific-firmware update-command,
wherein the at least one information processing apparatus is configured to:
acquire specific-firmware-information from the relay server through the first connection,
acquire specific firmware from the firmware providing server indicated by the specific-firmware location-information based on the specific-firmware location-information included in the acquired specific-firmware-information, and
update the firmware of the particular update target apparatus with the acquired specific firmware, and wherein the first communication protocol is a communication protocol to continuously or intermittently maintain the session between the information processing apparatus and the relay server, and the second communication protocol is a request-response protocol that has a form in which responses are transmitted with respect to requests to establish the second connection between the relay server and the specific server.

8. The relay server according to claim 7, further comprising:
a storage configured to store information,
wherein the control device is configured to:
store, when the specific-firmware update-command is acquired, the specific-firmware-information in association with the apparatus information based on the specific-firmware update-command; and
transmit, when a particular transmission condition relating to one information processing apparatus is satisfied, the specific-firmware-information, which is corresponding to the one information processing apparatus and stored in the storage, to the one information processing apparatus through the first connection.

9. The relay server according to claim 8, wherein the transmission condition is at least one of that the specific-firmware-information is stored and that a connection for communications according to the first communication protocol is performed from the at least one information processing apparatus to the relay server.

10. The relay server according to claim 7, wherein the control device is configured to:
acquire a specific-firmware release-command from the specific server through the second connection, wherein the specific-firmware release-command is to return the specific firmware of a particular release target apparatus of the at least one information processing apparatus and includes at least apparatus information indicating the release target apparatus; and
transmit release information, which represent to return the specific firmware to the embedded-firmware, to the release target apparatus through the first connection based on the acquired specific-firmware release-command.

11. The relay server according to claim 8, wherein the control device is configured to:
acquire a specific-firmware release-command from the specific server through the second connection, wherein the specific-firmware release-command is to return the specific firmware of a particular release target apparatus of the at least one information processing apparatus and includes at least apparatus information indicating the release target apparatus; and
delete, when the specific-firmware release-command is acquired, the specific-firmware-information, which is corresponding to the release target apparatus and stored in the storage, based on the specific-firmware release-command.

12. The relay server according to claim 7, wherein the first communication protocol is XMPP over BOSH (eXtensible Messaging and Presence Protocol over Bidirectional-streams Over Synchronous HTTP).

13. The relay server according to claim 7, wherein the second communication protocol is HTTP (HyperText Transfer Protocol).

14. A non-transitory computer-readable medium storing computer-readable instructions that, when executed by a control device of a relay server configured to perform communication with a specific server and at least one information processing apparatus through a network, are configured to:
- establish, in response to a request from the information processing apparatus, a first connection between the relay server and the information processing apparatus when a session according to a first communication protocol enabling server push from the relay server is established;
- establish a second connection according to a second communication protocol different from the first communication protocol, between the relay server and the specific server;
- acquire a specific-firmware update-command from the specific server through the second connection, wherein the specific-firmware update-command is to update firmware of a particular update target apparatus of the at least one information processing apparatus with specific firmware and includes at least apparatus information indicating the update target apparatus and specific-firmware location-information indicating a location of the specific firmware; and
- transmit specific-firmware-information including at least the specific-firmware location-information, to the update target apparatus through the first connection based on the acquired specific-firmware update-command, wherein the first communication protocol is a communication protocol to continuously or intermittently maintain the session between the information processing apparatus and the relay server, and the second communication protocol is a request-response protocol that has a form in which responses are transmitted with respect to requests to establish the second connection between the relay server and the specific server, and wherein the information processing apparatus is configured to:
- acquire the specific-firmware-information, which is transmitted to the information processing apparatus from the relay server through the first connection,
- acquire the specific firmware from a firmware providing server indicated by the specific-firmware location-information based on the specific-firmware location-information included in the acquired specific-firmware-information, and
- update the firmware of the particular update target apparatus with the acquired specific firmware.

15. A communication system, which includes a relay server configured to perform communication with a specific server and at least one information processing apparatus through a network, the at least one information processing apparatus configured to perform communication with the relay server and a firmware providing server through the network, the relay server configured to:
- establish, in response to a request from the information processing apparatus, a first connection between the relay server and the information processing apparatus when a session according to a first communication protocol enabling server push from the relay server is established;
- establish a second connection according to a second communication protocol different from the first communication protocol, between the relay server and the specific server;
- acquire a specific-firmware update-command from the specific server through the second connection, wherein the specific-firmware update-command is to update firmware of a particular update target apparatus of the at least one information processing apparatus with specific firmware and includes at least apparatus information indicating the update target apparatus and specific-firmware location-information indicating a location of the specific firmware; and
- transmit specific-firmware-information including at least the specific-firmware location-information, to the update target apparatus through the first connection based on the acquired specific-firmware update-command, wherein the first communication protocol is a communication protocol to continuously or intermittently maintain the session between the information processing apparatus and the relay server, and the second communication protocol is a request-response protocol that has a form in which responses are transmitted with respect to requests to establish the second connection between the relay server and the specific server, and the information processing apparatus is configured to:
- establish the first connection between the information processing apparatus and the relay server;
- acquire the specific-firmware-information, which is transmitted to the information processing apparatus from the relay server, through the first connection;
- acquire the specific firmware from the firmware providing server indicated by the specific-firmware location-information, based on the specific-firmware location-information included in the acquired specific-firmware-information; and
- update the firmware of the particular update target apparatus of the at least one information processing apparatus with the acquired specific firmware.

* * * * *